United States Patent [19]

Mathews et al.

[11] 3,966,690

[45] June 29, 1976

[54] MODIFIED HYDROCARBON RESINS

[75] Inventors: Glenn William Mathews; Milton Silas Wing, both of Lake Jackson, Tex.

[73] Assignee: The Dow Chemical Company, Midland, Mich.

[22] Filed: May 23, 1974

[21] Appl. No.: 472,568

Related U.S. Application Data

[63] Continuation-in-part of Ser. No. 357,434, May 4, 1973, abandoned.

[52] U.S. Cl. .................................. 526/283; 260/5; 260/888; 260/889; 526/337; 526/339; 428/462

[51] Int. Cl.² ................ C08F 232/02; C08F 236/04

[58] Field of Search ................ 260/80.7, 82, 85.3 R

[56] References Cited
UNITED STATES PATENTS

| | | | |
|---|---|---|---|
| 2,523,150 | 9/1950 | Schneider et al. | 260/82 |
| 2,559,498 | 7/1951 | Garber et al. | 260/82 |
| 2,631,953 | 5/1953 | Hubbard et al. | 154/43 |
| 2,696,950 | 4/1954 | Sparks et al. | 260/80.7 |
| 3,436,379 | 4/1969 | Hambling et al. | 260/80.7 |
| 3,661,870 | 5/1972 | Bullard | 260/80.7 |
| 3,692,756 | 9/1972 | St. Cyr | 260/80.7 |
| 3,893,986 | 7/1975 | Komai et al. | 260/80.7 |

FOREIGN PATENTS OR APPLICATIONS

| | | | |
|---|---|---|---|
| 7,314,002 | 4/1974 | Netherlands | 260/80.7 |

*Primary Examiner*—Stanford M. Levin
*Attorney, Agent, or Firm*—Benjamin G. Colley

[57] ABSTRACT

Thermoplastic hydrocarbon resins are obtained by copolymerizing an isoolefin such as isobutylene with a diolefin such as piperylene in the present of a Friedel-Crafts catalyst in an inert hydrocarbon solvent.

These resins have a softening point in the range from 80° to 110°C. and are compatible with ethylene vinyl acetate and polyethylene resins and are useful as tackifier resins or components in hot melt adhesives.

3 Claims, No Drawings

MODIFIED HYDROCARBON RESINS

CROSS REFERENCE TO RELATED APPLICATIONS

This application is a continuation-in-part of Ser. No. 357,434 filed May 4, 1973 and now abandoned.

BACKGROUND OF THE INVENTION

This invention relates to a thermoplastic tackifying hydrocarbon resin copolymer which is the product of the copolymerization of an isoolefin such as isobutylene or diisobutylene with a diolefin such as piperylene.

It is known from U.S. Pat. Nos. 2,753,325; 3,467,632; 3,577,398; 3,622,551; 3,639,366; and Belgium patent No. 784,518 that hydrocarbon resins can be prepared from the polymerization of a mixture of diolefins and monolefins. However, these prior patents do not suggest the use of a minor amount of isobutylene of diisobutylene and/or are relatively more expensive then the resins of this invention.

In regard to Belgium patent No. 784,518, this discloses an elastomer made from a major amount of isobutylene and a minor amount of isoprene or piperylene.

In regard to Patent No. 3,577,398, the present invention is a distinct improvement thereover in that it has been found that the $C_5$ monoolefin, 2-methyl-2-butene used therein can be replaced with the more economical monoolefins, isobutylene or diisobutylene to achieve substantially the same tackifying resins.

SUMMARY OF THE INVENTION

The present invention is a thermoplastic tackifying hydrocarbon resin, having a softening point in the range from 80° to 110°C., comprising the copolymer of A. an unsaturated $C_5$ feedstock which comprises a major amount of piperylene, and minor amounts of cyclopentene, isoprene and cyclopentadiene wherein the resin comprises from about 85 to about 60 weight percent of said feedstock and wherein greater than 50 weight percent of the resin comprises piperylene moieties and B. an isoolefin selected from isobutylene or diisobutylene wherein the resin comprises from about 15 to about 40 weight percent of said isoolefin.

A more preferred aspect of the present invention is wherein the amount of the isoolefin ranges from 18 to 25 weight percent and the amount of $C_5$ feedstock ranges from 75 to 82 weight percent.

The resins of this invention are light colored resins and have a weight average molecular weight less than about 5,000 and are useful as tackifying resins in pressure sensitive adhesives and hot melt adhesives. They have been found to be compatible with ethylene vinyl acetate and polyethylene resins.

DETAILED DESCRIPTION

The resins of this invention are prepared by reacting a mixture of a minor amount of an isoolefin such as isobutylene (isobutene) or diisobutylene with a major amount of an unsaturated $C_5$ feedstock comprising piperylene, cyclopentadiene, isoprene, cyclopentene and mixtures thereof.

The isobutylene is readily available from the fractionation of refinery gases from the cracking of petroleum.

Diisobutylene is readily available from the dimerization of isobutylene and refers to a mixture of isomeric compunds such as 2,4,4-trimethyl pentene-1, 2,4,4,-trimethyl pentene-2 and other $C_8H_{16}$ isomers. A minor amount of triisobutylene is usually present in the diisobutylene as $C_{12}H_{24}$ isomers such as pentamethylheptane-3 and neopentyl dimethylpentene-1.

The diolefins used in this invention are those generally recovered as by-products from the steam cracking of hydrocarbons to generate ethylene or propylene. They are commercially available as mixtures or the pure compounds. It is preferred to use the $C_5$ distillation cut of these by-products in the present invention for reasons of economy.

While the range of isobutylene and diisobutylene copolymerized in the above resin can vary from about 15 to about 40 weight percent, the preferred range is about 18 to about 25 weight percent.

The remainder of the resins of this invention is a diolefin or mixtures thereof as aforesaid.

The Friedel-Crafts catalysts used in the present invention are well known to those skilled in the art and can be, for example, phosphorous pentafluoride, boron trifluoride, alkyl aluminum chlorides, titanium tetrachloride, aluminum chloride, and the like. The amount of catalyst used can generally vary from about 0.25 to 5.0 weight percent based on the weight of the monomer used. Generally, this is considered a catalytic amount and is implied hereinafter by the expression in the presence of a Friedel-Crafts catalyst.

Generally, an inert hydrocarbon solvent or diluent is needed in order to prepare the resins of this invention in good yields. Examples of these are aromatic solvents such as benzene, toluene, or xylene; or an aliphatic solvent such as hexane, heptane, petroleum ether, naphtha, mineral spirts and the like.

The temperature of the reaction can vary from about 0° to about 95°C. with the preferred range being from about 20° to 50°C.

The following examples are presented solely to illustrate the present invention and are not considered to be a limitation of the scope thereof.

EXAMPLE 1

Into a 1 liter glass reaction flask were charged 200 grams of benzene and 6 grams of anhydrous aluminum chloride. The flask was heated to 20°-25°C. and 300 grams of an isoolefin/diolefin feed was added to the reactor dropwise over a period of one hour with continuous mixing. The feed mixture consisted of 15 weight percent pure isobutylene and 85 weight percent of a piperylene concentrate. This $C_5$ cut or piperylene concentrate had the following approximate composition in percent by weight:

| | |
|---|---|
| 2-methyl-butene-2 | 1.4 |
| pentene-2 | 2.5 |
| isoprene | 4.7 |
| cyclopentene | 31.6 |
| piperylene(cis and trans) | 55.7 |
| cyclopentadiene | 2.7 |
| other $C_5$'s | 1.4 |

After the feed addition was completed, the reaction was stopped by the addition of 150 ml. of 5% sulfuric acid to decompose the aluminum trichloride.

The reaction mixture was water washed and decanted four times to remove the inorganic residue, filtered, and flash distilled at 90°C. to remove unreacted feed and solvent.

The resin mixture remaining was then vacuum stripped at 5–10 mm. Hg to a temperature of 250°C. with a nitrogen sparge to remove the lower molecular weight polymer.

The final molten resin was poured onto an aluminum foil sheet and cooled, the yield was 238 grams or 79% of the feed of a light yellow resin which had a softening point of 101°C. by the ring and ball method. It was found to be very compatible with ethylene vinyl acetate copolymers (E.V.A.) and polyethylene resins in all proportions. The resin was found to have a weight average molecular weight of about 1200 and had about 56% by weight piperylene, about 5% isoprene, about 5% cyclopentadiene, about 16% cyclopentene and about 18% isobutylene copolymerized therein.

As a control, Example 1 was repeated using 300 grams of the $C_5$ feedstock or piperylene concentrate and no isobutylene. The yield was 81% of a resin having a softening point of 110°C. The resin was found to have very poor compatibility with polyethylene and ethylenevinyl acetate copolymers. In addition, this resin had very poor adhesion properties in pressure sensitive tape applications.

Compatible resins are also obtained when Example 1 is repeated using substantially pure piperylene in place of the piperylene concentrate.

EXAMPLE 2

Following the procedure of Example 1, a hydrocarbon feed consisting of 25 weight percent of diisobutylene concentrate, together with 75 weight percent of the piperylene concentrate set forth in Example 1, was copolymerized. The reaction temperature was maintained in the range from 25°–30°C. to give a yield of 71% of a resin having a softening point of 106°C. with the same excellent compatibility in polyethylene and E.V.A. resins. The resin contained about 55% by weight of piperylene, about 5% isoprene, about 5% cyclopentadiene, about 15% cyclopentene, and about 20% diisobutylene copolymerized therein.

EXAMPLE 3

The procedure of Example 2 was repeated using a feed of 10 weight percent isobutylene and 90 weight percent of the aforementioned $C_5$ distillation cut. This resulted in a yield of 69 percent by weight of a light yellow resin having a softening point of 105°C. which was compatible with polyethylene resins but slightly hazy in E.V.A. resins. The resin contained about 61% piperylene, about 5.5% isoprene, about 16% cyclopentene, about 5.5% cyclopentadiene and about 12% isobutylene copolymerized therein.

EXAMPLE 4

Example 2 was repeated using 32 weight percent of a diisobutylene concentrate and 68 weight percent of the aforementioned $C_5$ distillation cut. This resulted in a light yellow resin in 71% yield having a 96°C. softening point which was very compatible in polyethylene and E.V.A. resins. The resin contained about 50.3% piperylene, about 4.6% isoprene, about 4.6% cyclopentadiene, about 13.5% cyclopentene and about 27% diisobutylene copolymerized therein.

EXAMPLE 5

To demonstrate the efficiency of the resins of this invention when employed in a standard pressure sensitive type system, the resins produced in Examples 1 and 2 were compared with Wingtack-95*. The resins were compounded with pale crepe rubber and dissolved in hexane, the cements were then coated onto a suitable tape stock for testing. The coated samples were dried for 24 hours and tested for quick-stick, peel, and creep (Pressure Sensitive Tape Council Test Methods). The results are shown in the following table.

| Resin | Quick Stick | Peel | Creep |
|---|---|---|---|
| Wingtack 95 | 48 oz. | 48 oz. | 37 min. |
| Example 1 | 56 oz. | 52 oz. | 70 min. |
| Example 2 | 68 oz. | 56 oz. | 45 min. |

The above results indicate that the resins of Examples 1 and 2 are superior in all tests compared to the commercial resin. * A commercial resin, prepared from piperylene and about 20–50% by weight of 2-methylbutene-2.

We claim:
1. A thermoplastic tackifying hydrocarbon resin having a softening point in the range from 80° to 110°C. comprising the copolymer of
   A. an unsaturated $C_5$ feedstock which comprises a major amount of piperylene, and minor amounts of cyclopentene, isoprene, and cyclopentadiene wherein the resin comprises from about 85 to about 60 weight percent of said feedstock and wherein greater than 50 weight percent of the resin comprises piperylene moieties and
   B. diisobutylene wherein the resin comprises from about 15 to about 40 weight percent of said diisobutylene.
2. The resin of claim 1 wherein the amount of the diisobutylene ranges from 18 to 25 weight percent and the amount of $C_5$ feedstock ranges from 75 to 82 weight percent.
3. The resin of claim 1 wherein the $C_5$ feedstock is substantially pure piperylene.

* * * * *